Feb. 15, 1938.   L. A. FRAYER   2,108,709
APPARATUS FOR MAKING BOLTS OR THE LIKE
Filed Sept. 24, 1935   9 Sheets-Sheet 1

INVENTOR.
LEE A. FRAYER
BY
Kwis, Hudson & Kent
ATTORNEYS.

Fig. 3

Feb. 15, 1938. L. A. FRAYER 2,108,709
APPARATUS FOR MAKING BOLTS OR THE LIKE
Filed Sept. 24, 1935 9 Sheets-Sheet 3

INVENTOR.
LEE A. FRAYER
BY
Kwis, Hudson & Kent
ATTORNEYS.

Feb. 15, 1938.  L. A. FRAYER  2,108,709
APPARATUS FOR MAKING BOLTS OR THE LIKE
Filed Sept. 24, 1935  9 Sheets-Sheet 5

INVENTOR.
LEE A. FRAYER
BY
Kwis, Hudson & Kent
ATTORNEYS.

Feb. 15, 1938.  L. A. FRAYER  2,108,709
APPARATUS FOR MAKING BOLTS OR THE LIKE
Filed Sept. 24, 1935  9 Sheets-Sheet 7

INVENTOR.
LEE A. FRAYER
BY
*Kwis, Hudson & Kent*
ATTORNEYS.

Feb. 15, 1938. L. A. FRAYER 2,108,709
APPARATUS FOR MAKING BOLTS OR THE LIKE
Filed Sept. 24, 1935 9 Sheets-Sheet 8

INVENTOR.
LEE A. FRAYER
BY Kwis, Hudson & Kent
ATTORNEYS

Patented Feb. 15, 1938

2,108,709

UNITED STATES PATENT OFFICE 2,108,709

APPARATUS FOR MAKING BOLTS OR THE LIKE

Lee A. Frayer, Kent, Ohio, assignor to The Lamson & Sessions Company, Cleveland, Ohio, a corporation of Ohio Application September 24, 1935, Serial No. 41,908

18 Claims. (Cl. 10—11)

This invention relates to improved apparatus for rapidly and economically producing knurled and threaded bolts or like metal articles.

An object of the present invention is to provide improved apparatus for making bolts, or the like, and having novel means for pointing the blanks and novel means for threading the blanks.

Another object of the invention is to provide improved apparatus for making bolts, or the like, wherein means is provided for rolling a blank to accurate shape, and then knurling and threading different portions thereof, and wherein the rolling, knurling and threading are carried out as a substantially continuing operation.

Another object of the invention is to provide improved apparatus, of the type referred to, having novel feed and transfer mechanism for handling the blanks upon which the operations are performed.

A further object of the invention is to provide improved bolt making apparatus embodying a pointing device and a mechanism for feeding blanks thereto, including means adapted to grip each blank while it is being operated upon by the pointing device.

A further object of the invention is to provide improved bolt making apparatus wherein a pointing device is shiftable relative to a blank gripping device to bring the pointing device into operative engagement with the blank held by the gripping device, and wherein the gripping of the blanks by the gripping device is responsive to shifting of the pointing device.

Still another object of the invention is to provide novel transfer mechanism for a multiple station machine, wherein a bar having blank engaging means is arranged for movement longitudinally and rotarily of its axis.

A further object of the invention is to provide novel transfer mechanism, of the type referred to, wherein the means for actuating the bar includes universal movement linkage connected therewith.

It is also an object of this invention to provide a machine for making bolts, or the like, embodying a die mechanism and a mechanism for supplying blanks thereto and wherein the drive means for at least one of said mechanisms includes an overload responsive device.

Other objects and advantages of the invention will be apparent from the following description when taken in conjunction with the accompanying sheets of drawings wherein.

In the accompanying drawings I have shown improved apparatus for making bolts or the like, and for the purposes of the present disclosure more detailed reference will be made thereto. It will be understood, of course, that the invention may be embodied in various other arrangements and devices.

Figures 12, 13, 14, 15, 18, 19, 20:
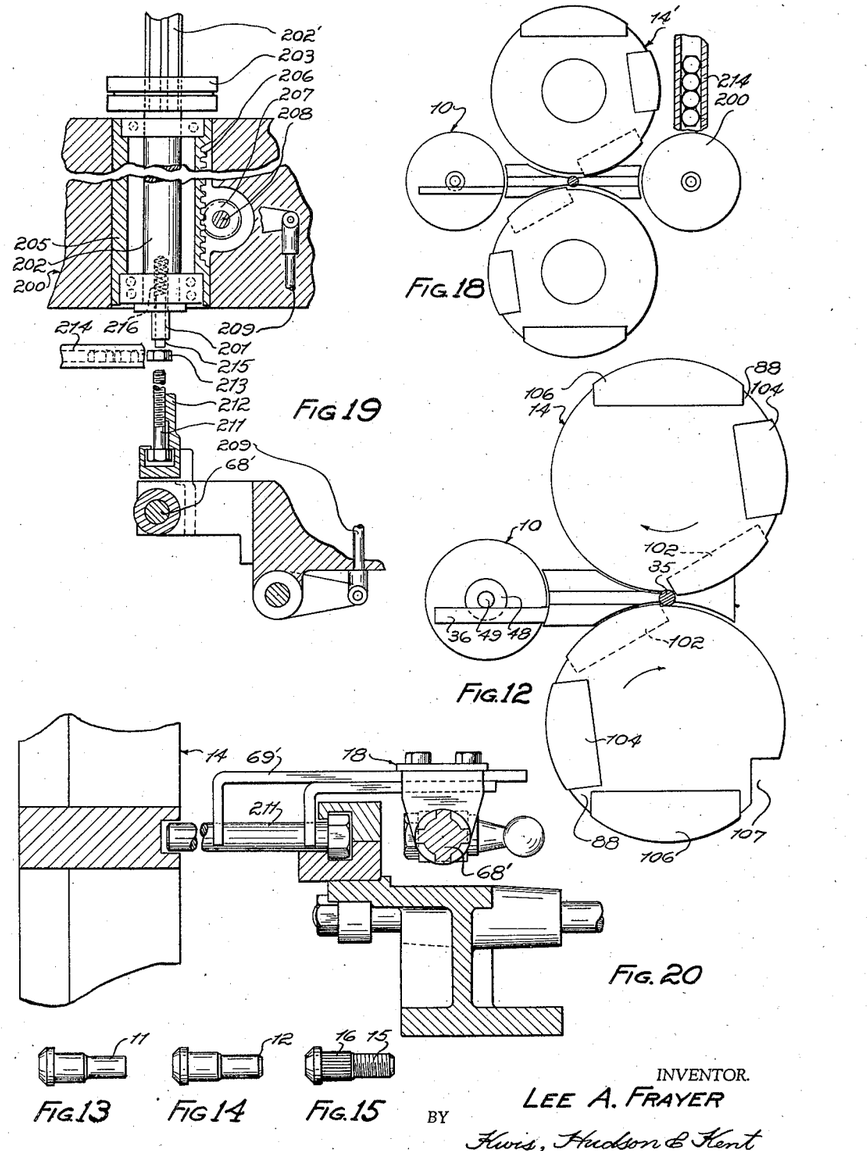
Fig. 12 is an elevational view, of more or less diagrammatic form, showing the relative arrangement of the pointing device and the die mechanism.
Fig. 13 is an elevation showing one of the blanks upon which the present apparatus is adapted to operate.
Fig. 14 is an elevation showing the same blank after the pointing operation has been performed thereon.
Fig. 15 is an elevation showing the blank after the same has been knurled and threaded by my improved apparatus.
Fig. 18 is an end view, of more or less diagrammatic form, showing the relative arrangement of the different mechanisms of the machine.
Fig. 19 is a sectional view taken through the nutting mechanism of the machine, as indicated by line 19—19 of Fig. 16.
Fig. 20 is a sectional view of the transfer mechanism taken on line 20—20 of Fig. 16.

My improved bolt making machine comprises a plurality of mechanisms, to be described in detail hereinafter, which function in cooperating relation and in succession such that the various steps are carried out on the blanks automatically and as substantially one continuing operation. These mechanisms include a rotatable and shiftable die mechanism 10 which operates on the stem end of a blank, such as the blank 11 shown in Fig. 13, to provide such stem end with a bevel or chamfer 12, as shown in Fig. 14. Because of the character of the operation performed by this mechanism it may be conveniently referred to as a pointing device. The machine includes another rotary die mechanism 14 to which the blanks are delivered after the pointing operation has been performed thereon by the device 10. The mechanism 14 may include dies for rolling the blank to substantially accurate form, dies for forming a thread on a portion of the blank, such as the thread 15 of the blank shown in Fig. 15, and dies for knurling another portion of the blank as indicated at 16 in Fig. 15. My improved machine also includes a feed and transfer mechanism 18 for feeding the blanks to the pointing device and transferring the same from the pointing device to the die mechanism 14.

Figure 1:
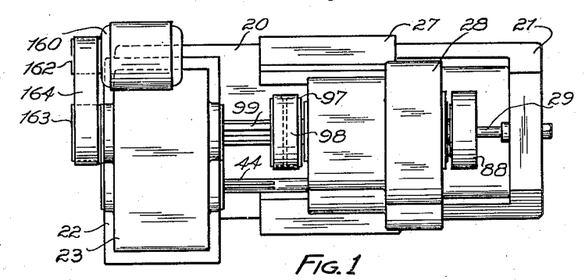
Fig. 1 is a plan view, of more or less diagrammatic form, showing a bolt making machine embodying my invention but with the feed and transfer mechanism omitted therefrom.
Figure 2:
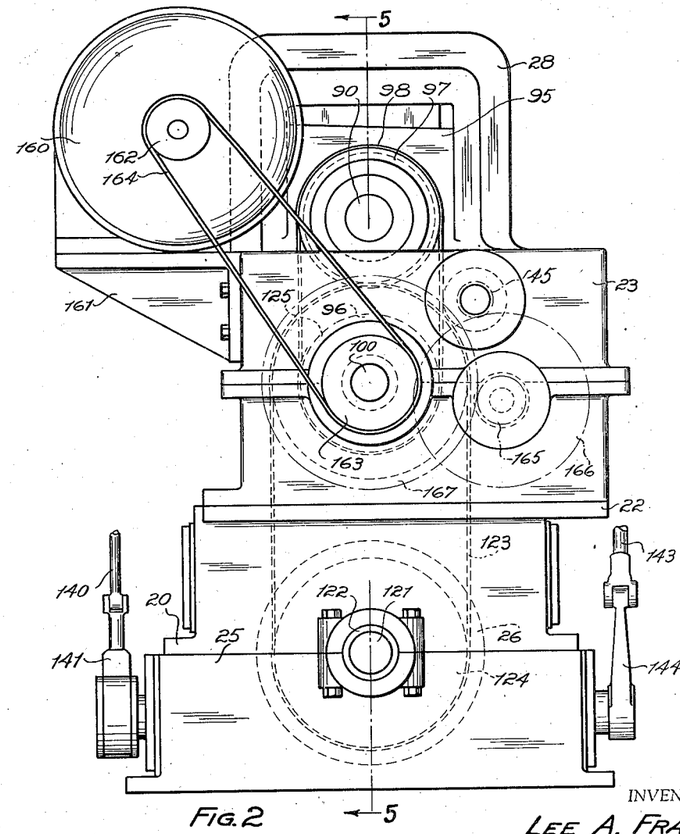
Fig. 2 is an elevation of one end of the machine.
Figure 5:
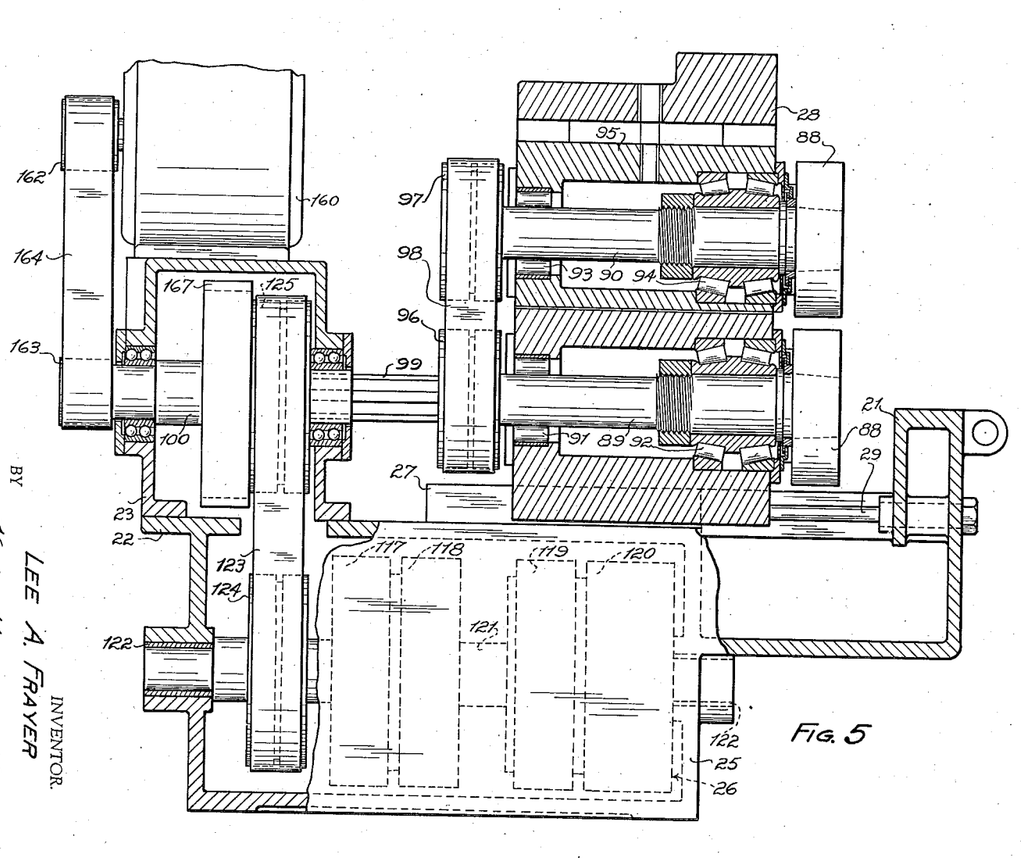
Fig. 5 is a longitudinal sectional view taken through the machine as indicated by line 5—5 of Fig. 2.

As shown in Figs. 1 and 2 my improved machine may be provided with a suitable frame 20 which forms a support for the various parts and mechanisms of the machine. A forwardly projecting part 21 of the frame provides a support for the feed and transfer mechanism 18 and an oppositely extending part 22 of the frame provides a support for a gear box 23. The lower part of the frame may be hollow as shown in Fig. 5, to provide a casing 25 in which is disposed a cam arrangement 26. An intermediate portion of the frame is provided with laterally spaced ways 27 which slidably receive a movable head 28. This movable head provides a mount for the die mechanism 14 and the pointing device 10, and is adjustable relative to the feed and transfer mechanism 18 so as to accommodate the machine for work upon different length blanks. The head 28 may be adjusted and held in a desired position relative to the frame portion 21 and to the feed and transfer mechanism 18 by means of a suitably arranged adjusting rod 29.

Figure 7:
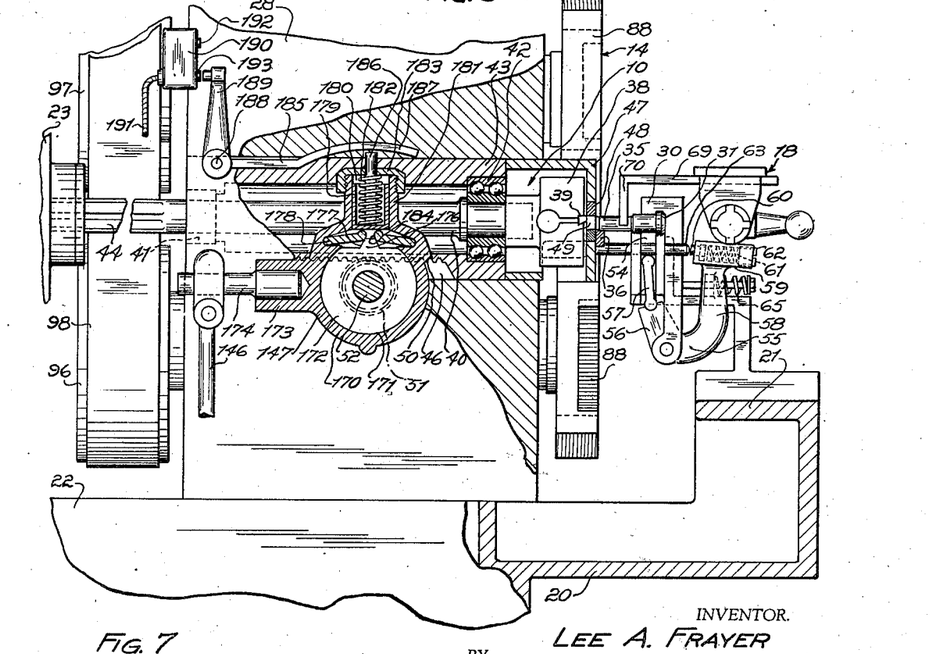
Fig. 7 is a sectional elevation of the same apparatus taken on line 7—7 of Fig. 6.
Figures 8, 9:
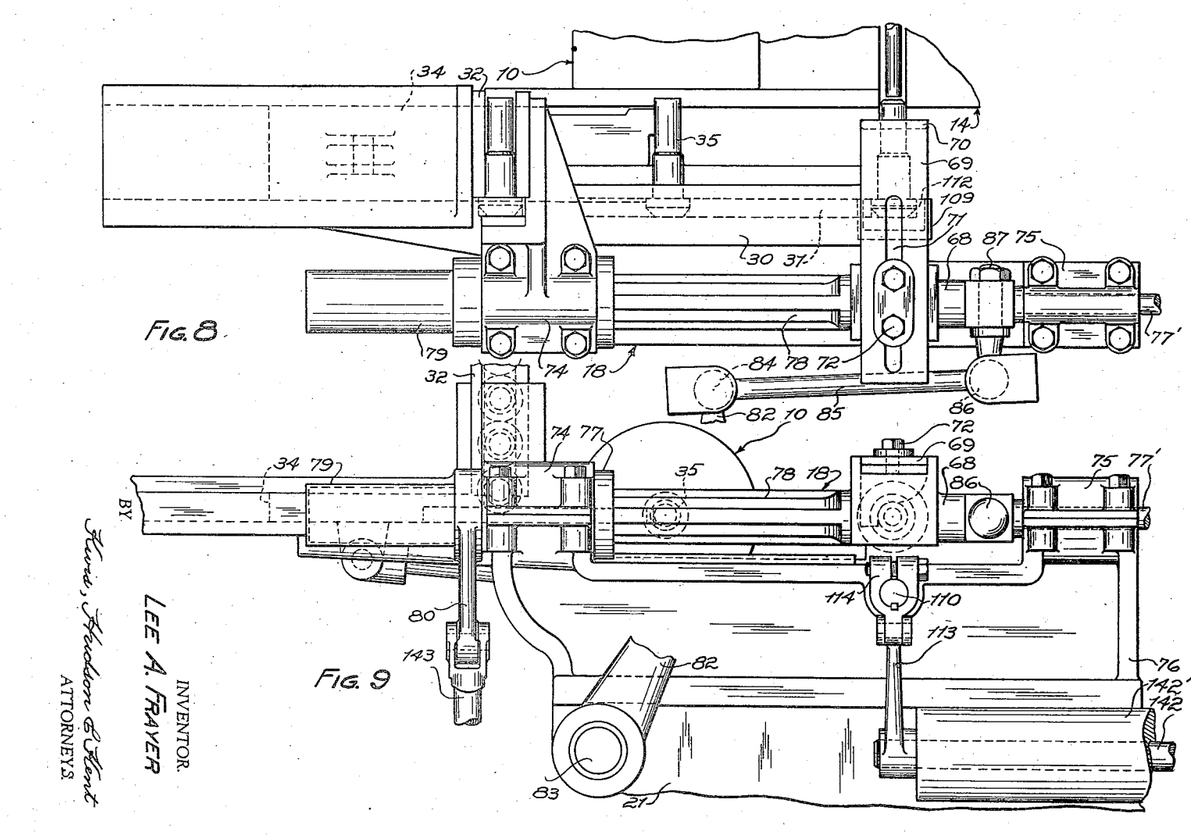
Fig. 8 is a plan view of the feed and transfer mechanism.
Fig. 9 is an elevational view thereof.
Figure 10:
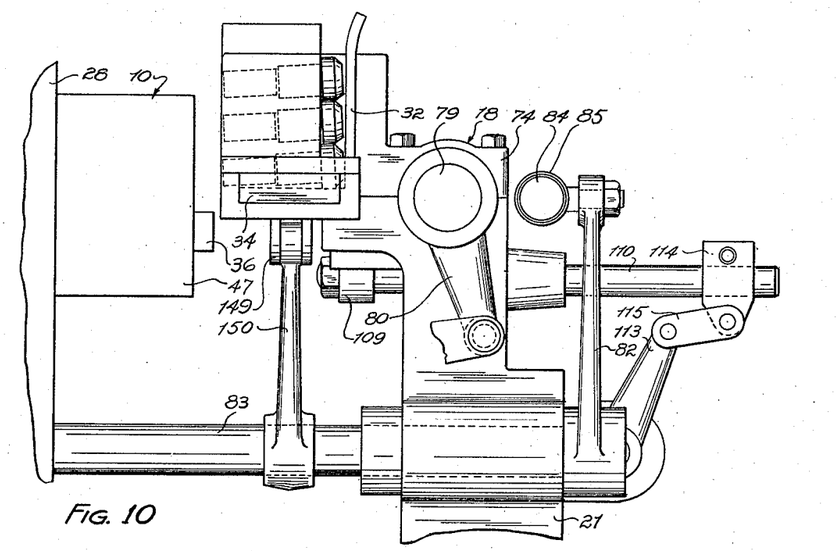
Fig. 10 is an elevation showing one end of the feed and transfer mechanism.
Figure 11:
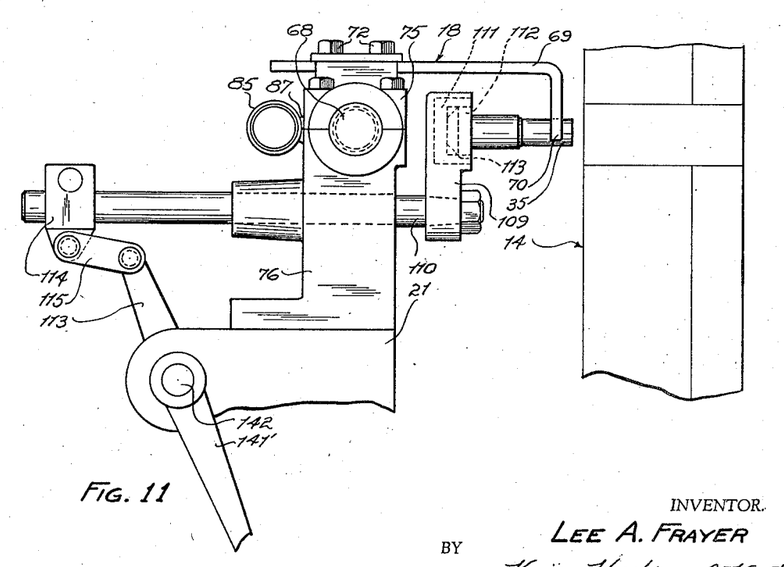
Fig. 11 is an elevation at the opposite end of the transfer mechanism.

The feed and transfer mechanism 18 is carried by the frame portion 21 and extends transversely adjacent the pointing device 10 and the die mechanism 14. This mechanism includes a transversely extending member 30 having a groove or guide channel 31 shaped to receive the head ends of the blanks and to support the blanks with the stem ends thereof extending toward the die devices 10 and 14. A supply of blanks may be contained in a suitable magazine 32 which is arranged to feed blanks in succession to the guide channel 31. The feeding of the blanks from the magazine to the guide channel may be controlled by a reciprocating shuttle-like member 34 which operates to remove an individual blank from the lower end of the magazine and to push the blank along in the guide channel 31 to a position opposite or in axial alignment with the pointing device 10. In Figs. 7 and 8 of the drawings I show a blank 35 in the position just mentioned. As the blank 35 is removed from the magazine 32 and pushed along the guide channel 31 toward the pointing device 10 the projecting stem end of the blank engages a transverse bar 36 which guides and supports this end of the blank.

The pointing device 10 is shiftable as a unit toward the feed and transfer mechanism 18 so as to be brought into engagement with the stem of the blank to operate thereupon. The pointing device may include a rotatable head 38 having suitable cutting tools 39 mounted thereon for engagement with the stem of the blank to form the chamfer 12 thereon. The rotary head 38 is mounted upon a drive shaft 40 which is in turn mounted in spaced bearings 41 and 42 carried by a sleeve 43. The shaft 40 projects rearwardly from the sleeve 43 and into the gear box 23. This projecting portion of the shaft is splined as indicated at 44 so as to have an extensible driving connection with a gear 45 contained in the gear box 23. The sleeve 43 is slidably mounted in an opening 46 of the head 28 so that movement of the sleeve toward or from the feed and transfer mechanism 18 will move the tool carrying head 38 toward or away from the blank 35.

At the forward end of the sleeve 43, I provide a hollow member 47 which is disposed around the rotary head 38. This hollow member is also slidable in the opening 46 and may be an extension of the sleeve 43. The end wall of the member 47 is provided with a guide 48 having an opening 49 which receives the stem end of the blank 35 when the rotary head 38 is shifted toward the feed and transfer mechanism 18 by the movement of the sleeve 43 in the opening 46. The guide bar 36 mentioned above as supporting and guiding the stem end of the blank 35 may be mounted upon the end wall or face of the hollow member 47 as shown in Figs. 7 and 12.

Longitudinal movement may be imparted to the sleeve 43 in various ways, but I find that this can be readily done by providing the sleeve with a rack 50 with which a pinion 51 cooperates. The pinion may be carried by a rock shaft 52 which is operated by mechanism to be described hereinafter.

Figure 6:
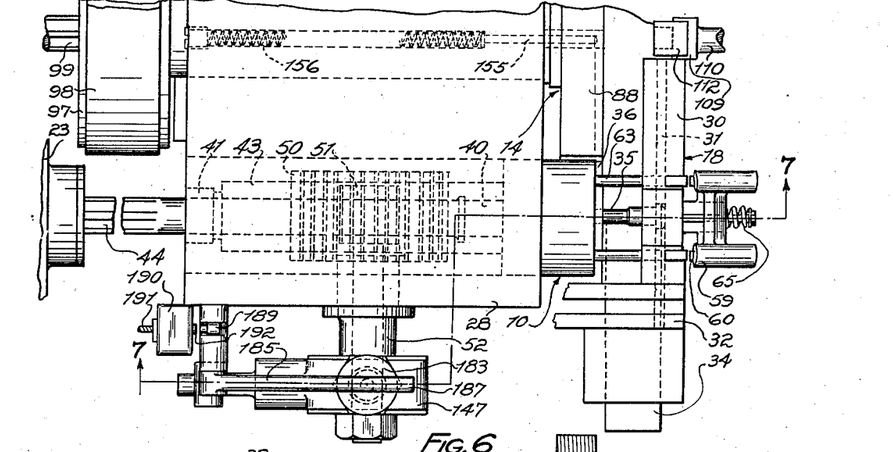
Fig. 6 is a partial plan view of the machine showing the pointing device and a portion of the blank feeding mechanism.

To enable the rotary head 38 of the pointing device to operate properly upon the stem end of the blank 35, it is necessary that the blank be gripped and held during the pointing operation. For the purpose of gripping a blank I provide the transverse member 30 with a movable plunger 54 which acts as a gripper. For operating this plunger in timed relation to the shifting of the pointing device, I provide means which actuates the gripper in response to the shifting of the pointing device. This means, as best shown in Figs. 6 and 7, includes a pivoted bell crank lever 55, which has the arm 56 thereof connected with the plunger 54 by means of a thrust link 57. The arm 58 of the bell crank lever carries laterally spaced hollow heads 59 which are disposed in spaced opposing relation to the hollow member 47 of the pointing device. Plungers 60 project from the hollow heads 59 and are normally held against movement into the heads by means of compression springs 61, the initial compression of which may be adjusted by means of screw plugs 62. Push rods 63, spaced laterally to correspond with the spacing of the heads 59, are disposed between the hollow member 47 of the pointing device and the plungers 60. These push rods serve to transmit motion between the pointing device and the bell crank lever 55 of the blank gripping means.

From the arrangement as thus far described, it will be seen that when a blank is fed from the magazine 32 and advanced by the shuttle 34 to the position shown in Fig. 7, the blank is ready to be pointed by the pointing device 10. With the blank in this position the sleeve 43 is operated through the rack and pinion members 50 and 51 to shift the member 47 and the rotary head 38 therein toward the blank. Shifting of the member 47 toward the right as seen in Fig. 7 causes the push rods 63 to rock the bell crank lever 55 about its pivot, thereby causing the thrust link 57 to push the gripping plunger 54 into gripping engagement with the blank.

As movement of the pointing device continues, the gripping force exerted by the plunger 54 will increase until the gripping force corresponds with a desired value therefor as determined by the adjustment of the compression of the springs 61. The shifting of the pointing device ultimately brings the tools 39 into engagement with the blank and, as the head 38 rotates continuously, the tools will operate to form a chamfer 12 on the blank. The operation of the rotary head 38 on the blank is followed by a retracting movement of the sleeve 43 to the left, as seen in Fig. 7, which moves the head 38 and the member 47 away from the blank. The retracting of the pointing device also allows the bell crank lever 55 to be rocked in a reverse direction by the compression spring 65, thereby releasing the gripping action of the plunger 54 on the blank. Immediately following the release of the blank by the gripping plunger 54, the transfer mechanism operates to shift the blank from the pointing station to a position adjacent the die mechanism 14 by which subsequent operations are to be performed on the blank.

As best seen in Figs. 8 and 9 of the drawings, the transfer mechanism includes a bar 68 which is mounted for both longitudinal and rotary movement and which carries a blank engaging member 69. The blank engaging member is connected to the bar intermediate its ends and extends at substantially right angles to the axis of the bar so that rotary movement of the bar will result in an arcuate sweeping of this member to cause the bifurcated outer end 70 thereof to engage or disengage the blank. The connection between the member 69 and the bar 68 may be adjusted by providing the member with a slot 71 through which the clamping screws or bolts 72 extend.

To provide for this rocking or rotary movement of the bar 68, I employ spaced supports 74 and 75 in which the bar is rotatably mounted. The supports 74 and 75 may be in the form of bearings carried by bracket 76 which is mounted upon the forwardly extending frame portion 21. The bearing 75 may be a bearing of usual construction in which a stem part 77' of the bar 68 is rotatable and slidable. The bearing 74, however, is provided with a rotatable bearing sleeve 77 which is internally splined to receive the splined portion 78 of the bar 68. The splined portion 78 of the bar is slidable in the bearing sleeve 77 but is non-rotatable with respect thereto. The bearing sleeve may, if desired, be provided with a cup-like cover 79 into which the splined portion 78 of the bar may extend. The bearing sleeve 77 is held against axial movement by the bearing bracket 74 and is adapted to be rotated or oscillated in the bearing bracket by means of its lever arm 80. By imparting swinging movement to the lever arm 80, by means to be explained hereinafter, the bearing sleeve 77 is oscillated in the bearing 74 and, by reason of the splined connection between the bearing sleeve 77 and the bar 68, the latter will also be rotated about its axis. Rotation of the bar will cause the bifurcated end of the member 69 to engage or disengage a blank, depending upon the direction of rotation of the bar.

For imparting longitudinal movement to the bar 68, I provide linkage which includes a lever 82 mounted upon a rock shaft 83. The free end of the lever 82 carries a universal joint element such as the ball 84 to which one end of a link 85 is swiveled. The other end of the link 85 is swiveled on a ball 86 which is carried by a stud 87 mounted on the bar 68. The ball connections provided between the lever 82 and the link 85, and between the link and the bar 68, provide a universal joint operating connection for imparting longitudinal movement to the bar without interfering with the rotary movement which must be imparted thereto for swinging the blank engaging member 69.

The operation of the transfer mechanism is timed with respect to the operation of the pointing device, and immediately following the release of the blank 35 by the gripping plunger 54, the bar 68 is rotated to swing the member 69 into engagement with the blank. Longitudinal movement is then imparted to the bar 68 through the universally connected linkage and the blank is shifted from the pointing station to a position opposite the die mechanism 14. In Fig. 8 of the drawings the transfer mechanism is shown as having just moved a blank to the position opposite the die mechanism. As soon as the blank has been transferred to this position rotary movement is again imparted to the bar 68 but in a direction to swing the member 69 out of engagement with the blank.

As mentioned above the die mechanism 14 may include die members for rolling, knurling and threading the blank, and while various die devices may be used in carrying out these steps, I find that rotary die mechanism of the type shown in the drawings is very satisfactory. This die mechanism comprises a pair of die holders 88 in the form of rotatable drums upon which the complemental die members are mounted, as will be presently explained. The drums 88 are carried upon shafts 89 and 90 which are arranged with their axes in parallel relation as shown in Fig. 5. The shaft 89 is rotatably mounted in bearings 91 and 92 provided in the lower part of the head 28. The shaft 90 is mounted in bearings 93 and 94 provided in a block 95 which is received in an opening of the head 28 and disposed immediately above the part of the head in which the shaft 89 is mounted. The block 95 is adjustable in the opening of the head 28 so that the spacing of the shaft 90 relative to the shaft 89 may be varied as required for best operation of the dies and by the characteristics of the blanks being worked.

The shafts 89 and 90 project rearwardly from the head 28 and are provided respectively with sprockets or pulleys 96 and 97. A chain or belt 98 extends around the sprockets or pulleys so that the shaft 90 may be driven from the shaft 89 and so that both shafts are rotated at the same speed and in a desired direction. For driving the die mechanism I employ an extensible connection provided by the splined portion 99 of the shaft 89. This splined shaft portion extends rearwardly into the gear casing 23 and is slidable in an internally splined portion of the countershaft 100. The extensible driving connection thus provided between the spline shaft 99 and the countershaft 100 permits the head 28 to be adjusted in the guides 27 while the driving connection to the die device is maintained.

As shown in Fig. 12 of the drawings the drums 88 rotate in the same direction causing the blank engaging portions of their periphery to move in opposite directions so that when the blank 35 is disposed therebetween it will be rotated upon its axis in a manner well known in the art. The drums 88 may carry a pair of complemental die members 102 in the form of segmental blocks set into the periphery of the drums. The die members 102 may consist of a pair of plain surfaced shaping or smoothing dies which roll the blank 35 therebetween and shape the stem portions of the blank to accurate size and form. The drums 88 may carry a second pair of complemental die members 104 which act on the blank in a similar manner immediately following the operation of the rolling dies 102. The dies 104 may be a pair of knurling dies having knurl forming teeth thereon to cut the knurling 16 on the stem portion of the blank. The drums 88 may carry a third set of complemental die members 106 which act on the blank immediately following the knurling dies 104. The die members 106 may be threading dies of well known construction having ridges thereon to cut or roll the thread 15 on the stem portion of the blank. The lower drum 88 may have a clearance recess 107 formed as a notch in the periphery thereof immediately following the threading die 106. This clearance recess permits the blank 35 to drop out from between the drums after the blank has been released from between the die members 106.

When the blank 35 has been shifted to a position opposite the die device 14 by the transfer mechanism, it is necessary to impart axial movement to the blank to move and hold the stem thereof inwardly between the drums 88 so that the die members carried by the latter can act on the stem portion. For causing this axial movement of the blank I provide a pushing device which may comprise an arm 109 carried upon a laterally slidable rod 110. The arm 109 is provided with a recess 111 in which an insert 112 is freely rotatable. The insert is also provided with a recess 113 which is of a size and shape to receive the head portion of the blank when the arm 109 is shifted toward the die device by the rod 110. The insert being freely rotatable in the arm 109 permits the blank to be rotated on its axis by the complemental die members operating in the manner explained above. Axial movement may be imparted to the rod 110 by means of a lever 113 to which the rod is connected by means of the collar 114 and the link 115.

Figure 3:
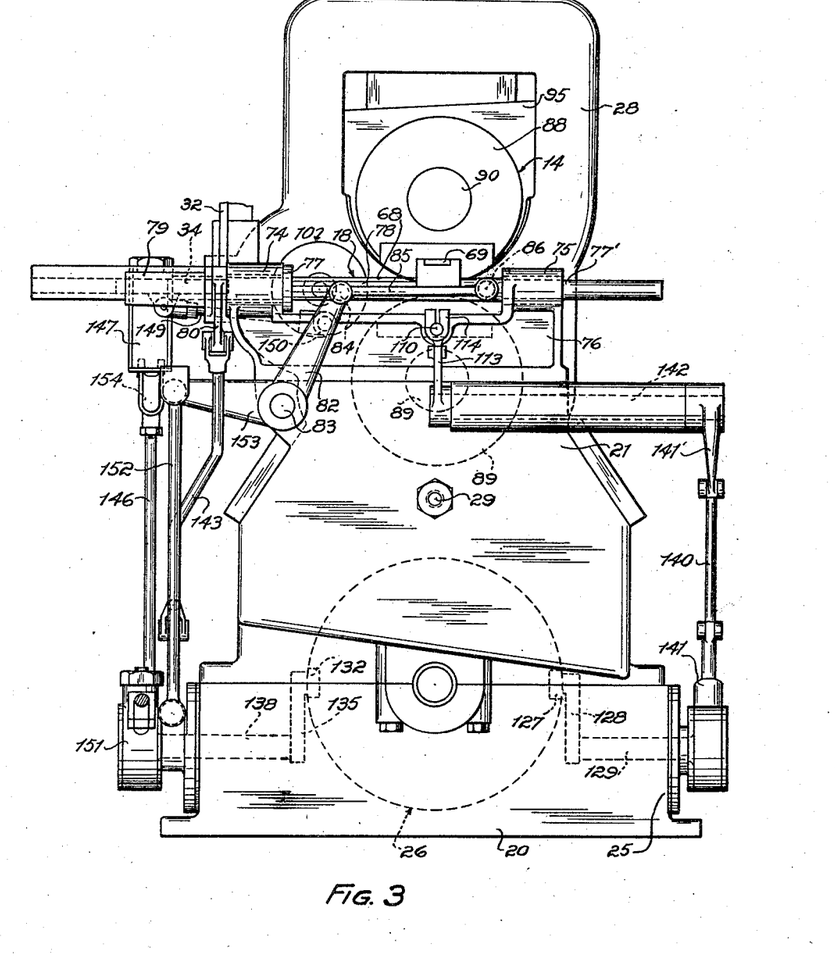
Fig. 3 is an elevation of the other end of the machine.
Figure 4:
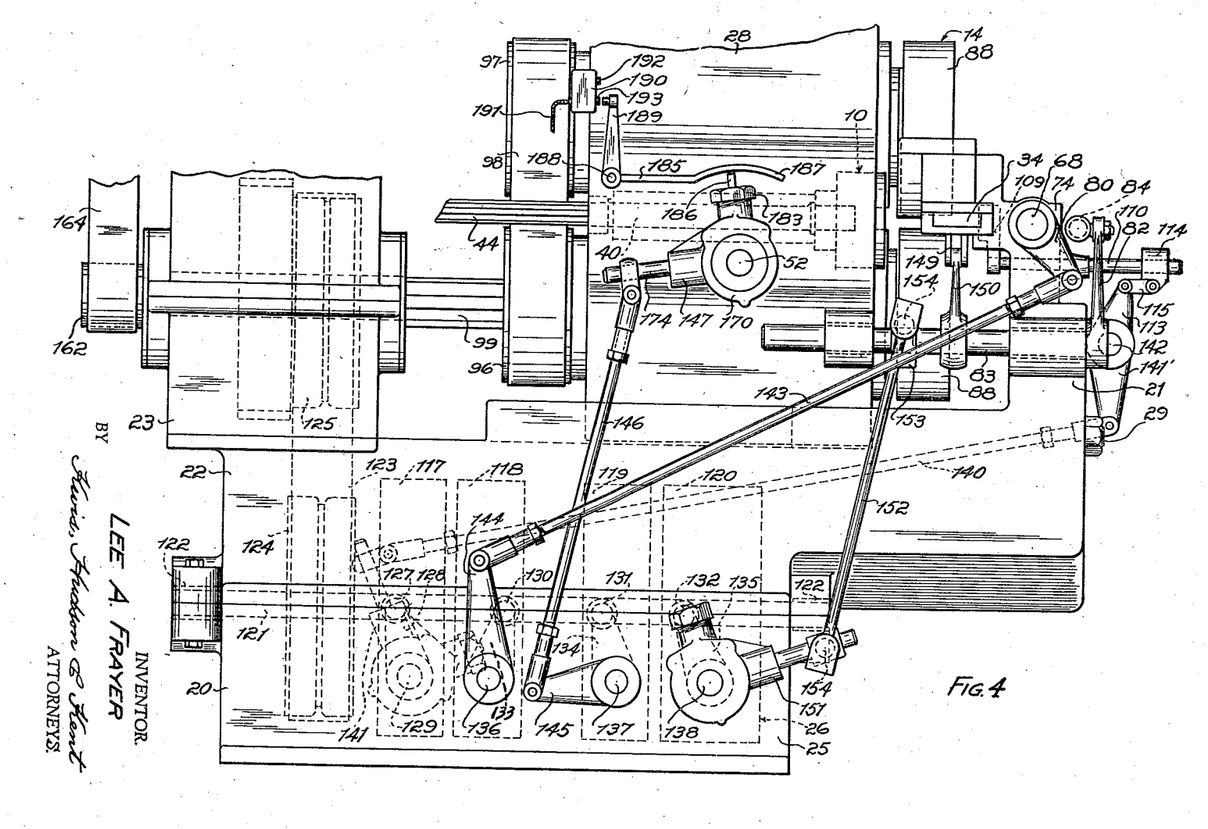
Fig. 4 is a side elevation of the machine.

I have previously referred to a cam arrangement 26 contained in a hollow intermediate part 25 of the frame of my machine, as shown in Figs. 4 and 5. This cam arrangement is provided for supplying motion to the pointing device and to the various parts of the blank feeding and transfer mechanism as will now be explained. The cam arrangement consists of four drums 117, 118, 119, and 120, all of which are mounted upon a drive shaft 121. This shaft may be supported in the bearings 122 and may be driven from the countershaft 100 by means of a chain or belt 123 extending around sprockets or pulleys 124 and 125 mounted respectively on the cam shaft and the countershaft. Each of the cam drums has a suitable cam face or groove thereon which imparts motion to a cam follower cooperating therewith. The cam follower for the cam drum 117 consists of a roller 127 carried by an arm 128 which is mounted on a rock shaft 129. Similarly the cam followers for the drums 118, 119, and 120 consist of rollers 130, 131, and 132 carried respectively by levers 133, 134, and 135 mounted upon corresponding rock shafts 136, 137, and 138. The rock shafts 129, 136, 137, and 138 are mounted in suitable bearings provided on the frame, and projected outwardly of such bearings as shown in Figs. 3 and 4.

The function of the cam 117 is to operate the blank pushing arm 109 and therefore I connect the lever 113 with the cam follower 127 which cooperates with this cam. This connecting means may be in the form of linkage comprising the rod 140 and a member 141 mounted on the rock shaft 129 to serve as a lever. The member 141 may be constructed to embody an overload release device of a detailed construction to be explained hereinafter. The outer end of the rod 140 is connected to a lever 141' which is carried by a rock shaft 142. This rock shaft is mounted in a suitable bearing 142' and also carries the lever 113.

The cam 118 supplies the arcuate movement which rotates or oscillates the bar 68 of the transfer mechanism about its axis to cause swinging movement of the blank engaging member 69 as explained above. This arcuate movement is supplied to the bar 68 through the rocking bearing sleeve 77, to which the cam follower 130 cooperating with the cam 118, imparts movement. The cam follower 130 is connected to the lever arm 80 of the rocking bearing sleeve by means of the link 143 and the lever 144 mounted on the rock shaft 136.

The function of the cam 119 is to shift the pointing device into and out of engagement with a blank held by the gripping plunger 54, and to enable the cam to perform this function I provide linkage which is connected with the cam follower 131. This linkage comprises a lever 145 mounted on the rock shaft 137 and a link 146 connecting this lever with the rock shaft 52 of the pinion 51 through an overload release device 147 mounted on the pinion shaft 52 so as to act as a lever.

The purpose of the cam 120 is to operate the blank feeding shuttle 34 and to impart longitudinal movement to the bar 68 of the transfer mechanism. It was explained above that the lever 82 of the universal linkage connected with the bar 68 is carried by a rock shaft 83, and it should now be noted that the shuttle 34 is also connected with the rock shaft 83 by means of the link 149 and the lever 150. The rock shaft 83 is actuated from the cam 120 by movement transmitted from the rock shaft 138 of the cam follower 132 through the overload release device 151 acting as a lever, and through a link 152 which connects the device 151 with a lever 153 of the shaft 83. The pivotal connections between the ends of the link 152 and the levers 151 and 153 are preferably ball swivels 154.

From the cam arrangement just described it will be seen that the pointing device and the various parts of the blank handling mechanism will be operated in timed relation such that a blank will be automatically fed from the magazine 32 to the pointing station and, after the pointing operation has been performed thereon, will be transferred to a position opposite the die device 14 and then shifted axially to insert the stem thereof between the drums carrying the die members. It will also be seen that while one blank is being transferred from the pointing station to the die device, a succeeding blank is being fed from the magazine to the pointing station.

For the purpose of ejecting the blanks from the die mechanism 14 after the operations have been performed thereon, I may provide a knock-out device which may be used instead of, or in conjunction with, the above mentioned recess 107 of the lower die drum 88. This knock-out device may be constructed and arranged in accordance with well known practice, and as shown in Fig. 6, may comprise a pin 155 which is shiftable axially by means of the compression spring 156.

Power for the operation of my improved bolt making machine may be supplied from any suitable source, and, if desired, may be furnished by an independent electric motor 160. When such an electric motor is employed it may be mounted upon a suitable bracket 161 carried by the frame of the machine and may be drivingly connected with the countershaft 100 by means of pulleys 162 and 163 and a belt 164 extending therearound. As explained above, power may be transmitted to the pointing device 10 and the die mechanism 14 through splined shafts 44 and 99, and power may be transmitted to the cam shaft 121 through the belt or chain 123. The power for the pointing device is transmitted to the gear 45, with which the splined shaft 44 cooperates, through a gear train comprising gears 165 and 166, the gear 165 meshing with a gear 167 of the countershaft 100 and the gear 166 meshing with the gear 45.

At different points of the present description I have referred to an overload release device serving as a power transmitting member. The levers 141, 147 and 151 have been referred to as being devices of this kind. These devices may also be used at various other points of the machine where their use might be found to be desirable. The purpose of an overload release device of this character is to prevent breakage of the machine should an overload occur for any reason, such as the result of incorrect feeding or positioning of blanks, or as the result of the feeding of an irregular or "wild" blank.

A construction which I have found to be satisfactory for an overload release device of this character is shown in Figs. 6 and 7 of the drawings. The device as here shown may comprise cooperating members adapted for relative arcuate movement but normally held against such movement by yieldable means. The cooperating members may, as shown in Fig. 7, be a hollow casing 170 having a cylindrical opening or chamber 171 therein, and a rotor 172 fitting the cylindrical chamber and operable therein. The rotor is keyed or otherwise connected to the power shaft 52 and the casing 170 is connected with another power member such as the link 146. To facilitate connection of the casing with the link 146 or other available power member, the casing may be constructed with an integral hub 173 having a connecting stud or pin 174 extending therefrom.

The rotor 172 is provided at one point of its periphery with a substantially radially extending projection 176 which is of tapered form and has oppositely inclined faces 177. The means for normally preventing relative rotation between the rotor and the casing cooperates with this projection 176.

The means cooperating with the projection 176 may comprise a pair of abutment levers 178 which engage the projection and are yieldably held thereagainst by a plunger 179 slidably mounted in an opening 180 of the casing. The levers 178 may be arranged with one end thereof pivoted on the casing and with their free ends extending toward each other and bearing against the oppositely inclined faces 177 of the projection 176. From the arrangement just described it will be seen that the projection 176 constitutes a cam which cooperates with the levers 178 with the latter acting as stops or abutments.

The plunger 179 is mounted in a radial projection 181 of the casing in which the opening 180 is formed. The plunger 179 is preferably hollow and a compression spring 182 is disposed in the plunger to bear against the end wall thereof and against a cover 183 provided on the projection 181. The spring 182 forces the plunger 179 radially inwardly, and the latter acting on the rounded portions 184 of the inner ends of the levers 178, presses the lever ends against the inclined faces of the projection 176. The levers cooperating in this manner with the projection 176 normally hold the casing and rotor against relative rotation so that power can be transmitted through the device between the link 146 and the shaft 52.

When excessive power is transmitted through the device, the cam action of one or the other of the inclined faces 177 against the end of its lever 178, depending on the direction in which power is being transmitted, forces the lever end outwardly thereby shifting the plunger 179 outwardly against the action of the spring 182. The outward movement of the lever end permits the projection 176 to travel past the lever which has been thus moved outwardly, or in other words, permits relative rotary movement between the casing and the rotor. The occurrence of this relative movement prevents the load being transmitted from exceeding a predetermined value and thus prevents breakage of machine parts. If the condition of overload continues the projection 176 may be disengaged from the levers a number of times as the rotor and casing are oscillated or rotated relative to each other. If the condition of overload is removed, the projection 176 will, upon reengagement with the lever ends, be held by the levers so that further relative movement between the rotor and casing will be prevented until another condition of overload occurs.

If desired a suitable control means may be associated with the overload release device to cause operation of signal mechanism or mechanism for stopping the machine. In the present arrangement I have shown a control means suitable for this purpose, comprising a lever 185 extending adjacent the projection 181 of the casing 170. A stem 186 carried by the plunger 179 extends through the cover 183 and into adjacent relation with the arcuate part 187 of the lever 185. When the plunger 179 is moved outwardly in the manner explained above, the stem 186 is also moved outwardly to engage and actuate the lever 185. This lever may be mounted upon a rock shaft 188 carrying a lever 189 which is arranged to operate a control device, such as an electric switch 190. This switch may have circuit connections 191 extending to a signal device, or to a relay or the like for controlling the circuit of the driving motor 160. The switch 190 may also have a manually operable starting or setting button 192, and a trip or stop button 193 disposed to be engaged and operated by the lever 189. With this control arrangement it will be seen that when an overload occurs and the normal operation of the machine is interrupted, a lever 185 will be actuated to operate the switch 190. The operation of this switch will result in a signal being given to indicate that the machine is out of normal operating condition or in the motor 160 being deenergized to prevent further operation of the machine.

Figures 16, 17:
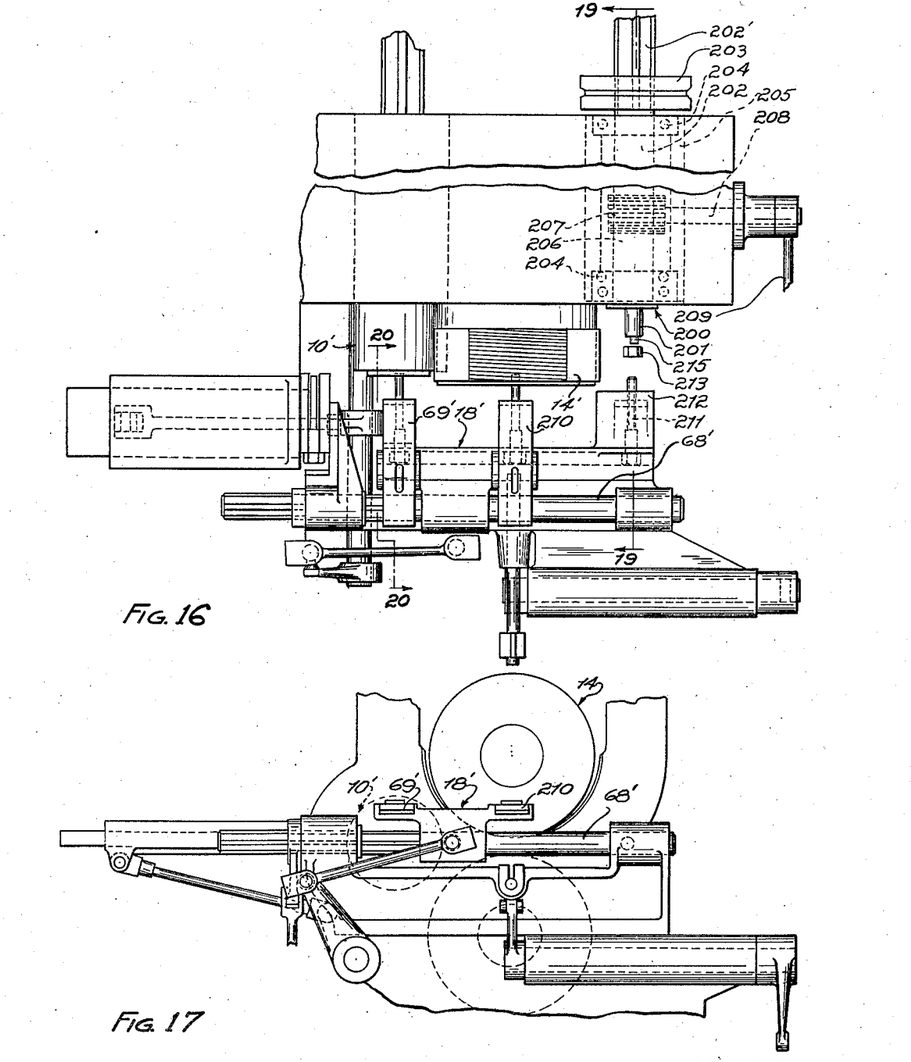
Fig. 16 is a partial plan view showing another bolt making machine constructed according to my invention.
Fig. 17 is an end view thereof.

In Figs. 16 and 17 of the drawings I have shown another embodiment of my invention in the form of a bolt making machine having a pointing mechanism and a die mechanism of the form already described, but having in addition a device for screwing nuts onto the bolts as they are delivered from the die device which performs the threading.

As shown in Fig. 16, the nutting device 200 may be located adjacent the die device 14' and comprises a spindle 201 which is movable toward and away from the transfer mechanism 18'. The spindle 201 may be rotated by a shaft 202 having a splined portion 202' affording an extensible driving connection with any available power member such as the sprocket 203. The shaft 202 is rotatably mounted in bearings 204 which are mounted in an axially shiftable sleeve 205. This sleeve is provided with a rack 206 with which a pinion 207 cooperates. The pinion is carried on a rock shaft 208 to which movement may be imparted by suitably operated linkage 209.

The bar 68' of the transfer mechanism and the guideway for the blanks are made somewhat longer than shown in Fig. 3 so as to extend adjacent the nutting device 200. The bar 68' of the transfer device carries a blank engaging member 69', similar to the member 69 and in addition carries a blank engaging member 210 for transferring the blanks from the die device 14' to a position opposite the nutting device 200. Fig. 19 shows a blank 211, in the form of a threaded hexagon headed bolt, disposed opposite the nuting device. For supporting the threaded stem portion of the bolt the guideway of the transfer device may have a laterally extending arm portion 212 which forms a rest for the stem portion of the blank.

When a blank 211 has been shifted to a position opposite the nutting device the linkage 209 rotates the pinion 207 to cause outward shifting of the sleeve 205. This shifting of the sleeve moves the spindle 201 outwardly to cause a nut 213 in the lower end of the magazine 214 to be impaled on the pin 215 which is slidable in the spindle and projects therefrom. Further outward movement of the spindle carries the impaled nut into engagement with the blank 211 and the rotation of the spindle causes the nut to be screwed onto the threaded portion of the stem. The sleeve 205 is then retracted to move the spindle and pin away from the blank. If desired a spring 216 may be provided in the shaft 202 to permit yielding of the pin 215 as the nut is screwed onto the blank. After the sleeve and the spindle have been retracted, the blank with the nut screwed thereon is free to be expelled laterally through the open end of the guideway by a succeeding blank being brought to the nutting position by the member 210.

From the foregoing description and the accompanying drawings it will now be readily seen that I have provided improved bolt making apparatus wherein blanks are automatically fed in succession to a pointing device, and to a die device having means for rolling, knurling and threading the blanks as a substantially continuing operation. It will be understood further that I have provided a novel arrangement for the die device and the pointing device, and have provided novel feed and transfer mechanism for handling the blanks, including novel means for gripping the blanks during the pointing operation.

While I have illustrated and described the improved apparatus of my invention in a somewhat detailed manner, it should be understood, however, that I intend my invention to include and cover all changes and modifications which do not constitute a departure from the spirit and scope of the present disclosure.

Having thus described my invention, I claim:

1. In apparatus of the character described, the combination of a work support including means operable to grip a blank, non-rotatable hollow means shiftable toward the work support and having guide means thereon for cooperation with the blank, a rotary die device in said hollow means and shiftable therewith into position to operate on the blank, means for shifting said hollow means, and means for rotating said die device.

2. In apparatus for making bolts or the like, the combination of a frame, work supporting means including a device for gripping one end of a blank and a laterally extending part forming a rest and guide for the other end thereof, a non-rotatable hollow member movable toward said gripping device, said guide being carried by said hollow member and movable thereby toward the gripping device, a rotary die device in said hollow member adjacent said guide and shiftable toward the gripping device to operate on a blank held by the latter, slidable means operable to cause movement of the hollow member with said guide thereon and said die device toward the gripping device, means for operating said slidable means, and means for driving said die device.

3. In apparatus of the character described, the combination of a work support having a plunger operable to grip and hold a blank while a die operation is performed thereon, a rotary die device axially shiftable toward said support into position to operate on a blank held by the gripping means, means for causing such shifting of the die device, and means for causing operation of the gripping plunger in response to shifting of the die device comprising a pivoted lever having one arm thereof connected with said plunger and an operating connection between the other arm and the die device.

4. In apparatus of the character described, the combination of a work support including means operable to grip a blank, hollow means shiftable toward the work support and having an opening adapted to receive a portion of a blank held by the gripping means, a rotary die device in said hollow means and shiftable into position to operate on said blank, means for rotating said die device, means for shifting said hollow means and die device, and means for causing operation of the gripping means in response to shifting of said hollow means.

5. In apparatus of the character described, the combination of a work support having a member movable to grip a blank, a rotary die device shiftable toward said support to operate on the blank, and means for causing operation of the gripping member in response to shifting of said die device comprising a pivoted lever, a link connecting one arm of the lever with the gripping member and an operating connection between the other arm of the lever and said die device, said link and one arm forming a toggle adapted to cause variation in the gripping pressure in accordance with the extent of shifting of the die device.

6. In a multiple station machine of the character described having a plurality of spaced work stations, a transfer mechanism adjacent said stations and operable to transfer blanks from one work station to another comprising a bar mounted for movement longitudinally and rotarily of its axis and having means for engaging a blank, and means for imparting rotary and longitudinal movements to said bar to cause engagement of the blank and shifting thereof from one work station to the other.

7. In a multiple station machine of the character described having a plurality of spaced work stations, a transfer mechanism adjacent said stations and operable to transfer blanks from one work station to another comprising a rotatable member, a bar slidable but non-rotatable in said member and having means for engaging a blank, means for imparting rotary movement to said member to cause the blank engaging means to engage and disengage a blank, and means for imparting longitudinal movement to said bar to cause shifting of the engaged blank from said one work station to the other.

8. In a multiple station machine of the character described having a plurality of spaced work stations, a transfer mechanism adjacent said stations and operable to transfer blanks from one work station to another comprising a rotatable bearing, a bar splined in said bearing for longitudinal movement therein and rotary movement therewith, said bar having means for engaging a blank, means for imparting rotary movement to the bearing to cause the blank engaging means to engage and disengage a blank, and means for imparting longitudinal movement to said bar to cause shifting of the engaged blank from said one work station to the other.

9. In a multiple station machine of the character described having a plurality of spaced work stations, a transfer mechanism adjacent said stations and operable to transfer blanks from one work station to another comprising a rotatable member, a bar slidable but non-rotatable in said member and having means for engaging a blank, means for imparting rotary movement to said member to cause the blank engaging means to engage and disengage a blank, and means having flexible connection with said bar for imparting longitudinal movement thereto to cause shifting of the engaged blank from said one work station to the other, said connection being adapted to also permit said rotary movement.

10. In a multiple station machine of the character described having a plurality of spaced work stations, a transfer mechanism adjacent said stations and operable to transfer blanks from one work station to another comprising a rotatable member, a bar slidable but non-rotatable in said member and having means for engaging a blank, means for imparting rotary movement to said member to cause the blank engaging means to engage and disengage a blank, and universal movement linkage for imparting longitudinal movement to said bar to cause shifting of the engaged blank from said one work station to the other.

11. In bolt forming apparatus the combination of a pointing device, a threading device spaced laterally therefrom, a guideway for blanks extending past said pointing and threading devices, a magazine adapted to contain a supply of blanks, means operable to move individual blanks along said guideway to a position to be operated upon by said pointing device, a bar mounted for rotary and longitudinal movement and having means for engaging a blank, and means for causing rotary and longitudinal movement of said bar to transfer a blank from the pointing position to a position to be operated upon by the threading device.

12. In bolt forming apparatus the combination of a pointing device, a threading device spaced laterally therefrom, a guideway for blanks extending past said pointing and threading devices, a magazine adapted to contain a supply of blanks, means operable to move individual blanks along said guideway to a position adjacent the pointing device, means providing for movement of the pointing device into operating engagement with a blank in said position, means responsive to movement of the pointing device for gripping the blank, and means for transferring the blank from the pointing position to a position adjacent the threading device.

13. In a machine for making bolts and the like, a frame having parts providing laterally spaced supports and an intermediate part providing a guideway, power means on one of said supports, a head adjustably movable along said guideway and providing a mount for a plurality of laterally spaced rotary die devices, a transfer mechanism mounted on the other of said supports to extend laterally in cooperating relation to said die devices and operable to transfer blanks from one die device to the other, means for adjusting said head toward and from the transfer mechanism, and a splined drive connection for operating said die devices from said power means.

14. In a machine for making bolts and the like, a frame having parts providing laterally spaced supports and an intermediate part providing a guideway, power means on one of said supports, a head adjustably movable along said guideway and providing a mount for a plurality of laterally spaced rotary die devices, a transfer mechanism mounted on the other of said supports to extend laterally in cooperating relation to said die devices and operable to transfer blanks from one die device to the other, means for adjusting said head toward and from the transfer mechanism, and a splined drive connection for operating said die devices from said power means, one of said die devices having a rotatable blank-pointing cutter and a supporting sleeve therefor which is reciprocable in said head for moving the cutter toward and from said transfer mechanism.

15. In apparatus of the character described the combination of a pair of cooperating thread rolling dies rotatable about vertically spaced substantially parallel axes and having a blank receiving space therebetween, a rotatable and axially shiftable pointing die spaced laterally from said threading dies and having a blank receiving opening on substantially the same horizontal plane as said blank receiving space, and a transfer mechanism extending laterally adjacent said blank receiving space and opening and operable to transfer blanks from the pointing die to the threading dies.

16. In apparatus of the character described the combination of a pair of cooperating thread rolling dies rotatable about vertically spaced substantially parallel axes and having a blank receiving space therebetween, a rotatable and axially shiftable pointing die spaced laterally from said threading dies and having a blank receiving opening on substantially the same horizontal plane as said blank receiving space, and a transfer mechanism operable to transfer blanks from the pointing die to the threading dies, said transfer mechanism including a substantially horizontal guideway extending adjacent said blank receiving space and opening and means adapted to engage and move blanks along said guideway.

17. In apparatus of the character described the combination of a pair of cooperating thread rolling dies rotatable about vertically spaced substantially parallel axes and having a blank receiving space therebetween, a rotatable and axially shiftable pointing die spaced laterally from said threading dies and having a blank receiving opening on substantially the same horizontal plane as said blank receiving space, and a transfer mechanism operable to transfer blanks from the pointing die to the threading dies, said transfer mechanism including a substantially horizontal guideway extending adjacent said blank receiving space and opening and a rotatable and axially shiftable means for causing movement of blanks along said guideway.

18. In apparatus of the character described the combination of a pair of cooperating thread rolling dies rotatable about vertically spaced substantially parallel axes and having a blank receiving space therebetween, a rotatable and axially shiftable pointing die spaced laterally from said threading dies and having a blank receiving opening on substantially the same horizontal plane as said blank receiving space, and a transfer mechanism operable to transfer blanks from the pointing die to the threading dies, said transfer mechanism comprising a substantially horizontal guideway extending adjacent said blank receiving space and opening, a rotatable and axially shiftable shaft extending substantially parallel with said guideway, and means adapted to engage and shift blanks along said guideway in response to the rotary and axial movements of said shaft.

LEE A. FRAYER.